US007190551B2

(12) United States Patent
Suda

(10) Patent No.: US 7,190,551 B2
(45) Date of Patent: Mar. 13, 2007

(54) COMPOSITE MAGNETIC HEAD AND PROCESS FOR PRODUCING THE SAME

(75) Inventor: Takashi Suda, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 364 days.

(21) Appl. No.: 10/981,484

(22) Filed: Nov. 5, 2004

(65) Prior Publication Data

US 2005/0122620 A1 Jun. 9, 2005

(30) Foreign Application Priority Data

Dec. 4, 2003 (JP) ............................. 2003-405513

(51) Int. Cl.
  *G11B 15/14* (2006.01)
(52) U.S. Cl. ...................... 360/121; 360/125
(58) Field of Classification Search ............... 360/121, 360/125, 118
  See application file for complete search history.

(56) References Cited

U.S. PATENT DOCUMENTS

| 4,996,609 | A | 2/1991 | Joannou |
| 5,689,384 | A | 11/1997 | Albrecht et al. |
| 6,236,525 | B1 * | 5/2001 | Cates et al. .................. 360/51 |
| 6,347,016 | B1 | 2/2002 | Ishida et al. |
| 6,700,729 | B1 * | 3/2004 | Beck et al. .................. 360/76 |
| 6,744,594 | B2 * | 6/2004 | Denison et al. ............. 360/121 |
| 6,898,045 | B2 * | 5/2005 | Beck et al. .................. 360/76 |
| 6,970,312 | B2 | 11/2005 | Yip et al. |

* cited by examiner

*Primary Examiner*—Angel Castro
(74) *Attorney, Agent, or Firm*—Sughrue Mion, PLLC

(57) ABSTRACT

A composite magnetic head comprising a DC-erasing head, which is slidably contact with a driving magnetic tape, and which DC-erases a servo band of the magnetic tape in such a manner that the direction of the magnetization of the servo band the servo band is directed towards one direction of the lengthwise direction of the magnetic tape; a servo writing head, which is slidably contact with the magnetic tape, and which writes a servo signal thereon so that the direction of the magnetization of the servo band is directed toward the reverse direction to the direction directed by the DC erasing head; and an AC-erasing head, which is contact with the magnetic tape, and which AC-erases the magnetization of the data band of the magnetic tape is disclosed. The servo writing head and the AC-erasing head are provided at downstream of the driving magnetic tape relative to the DC-erasing head, and the DC-erasing head, the servo writing head and the AC-erasing head are unified with each other.

20 Claims, 14 Drawing Sheets

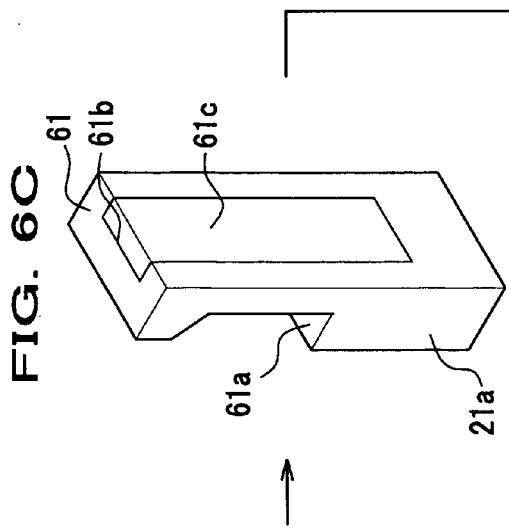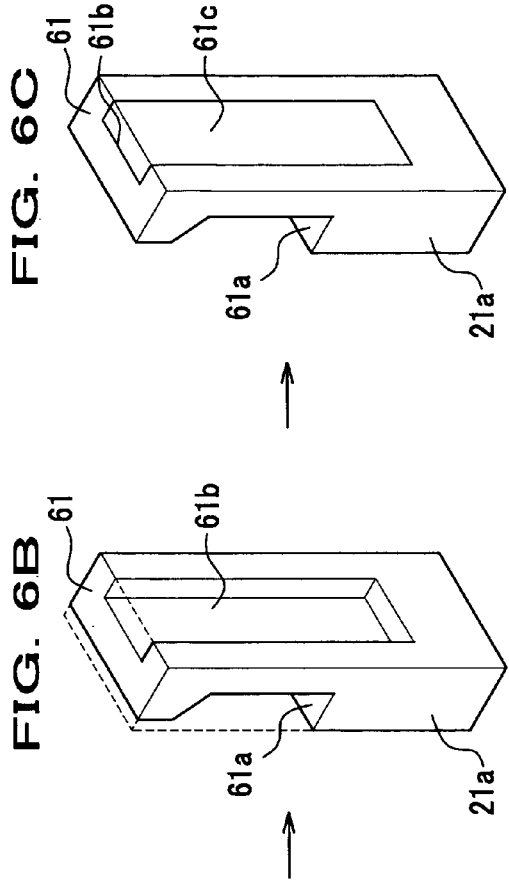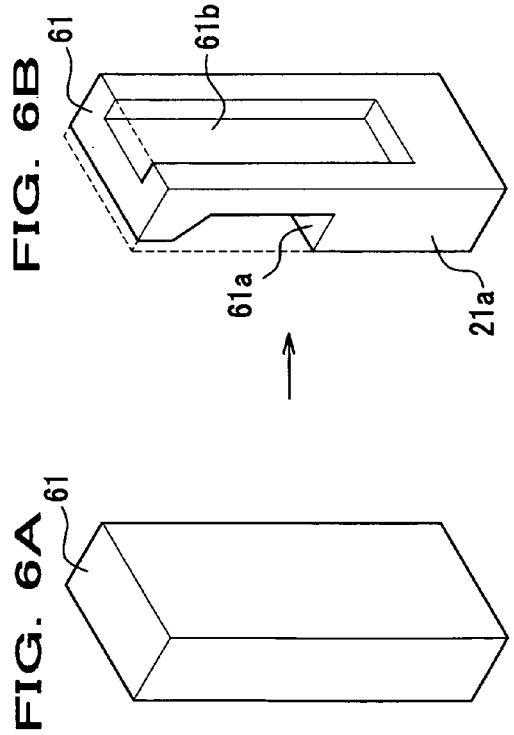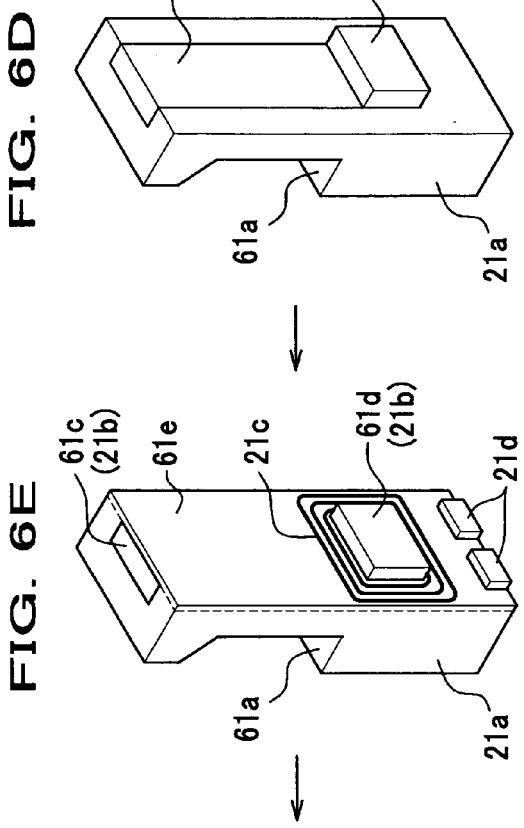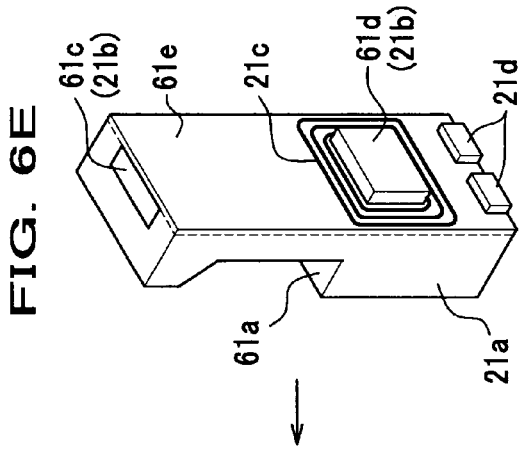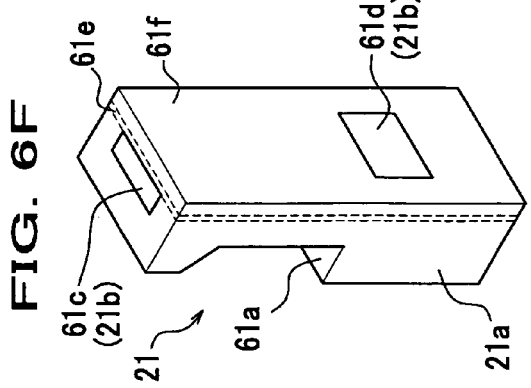

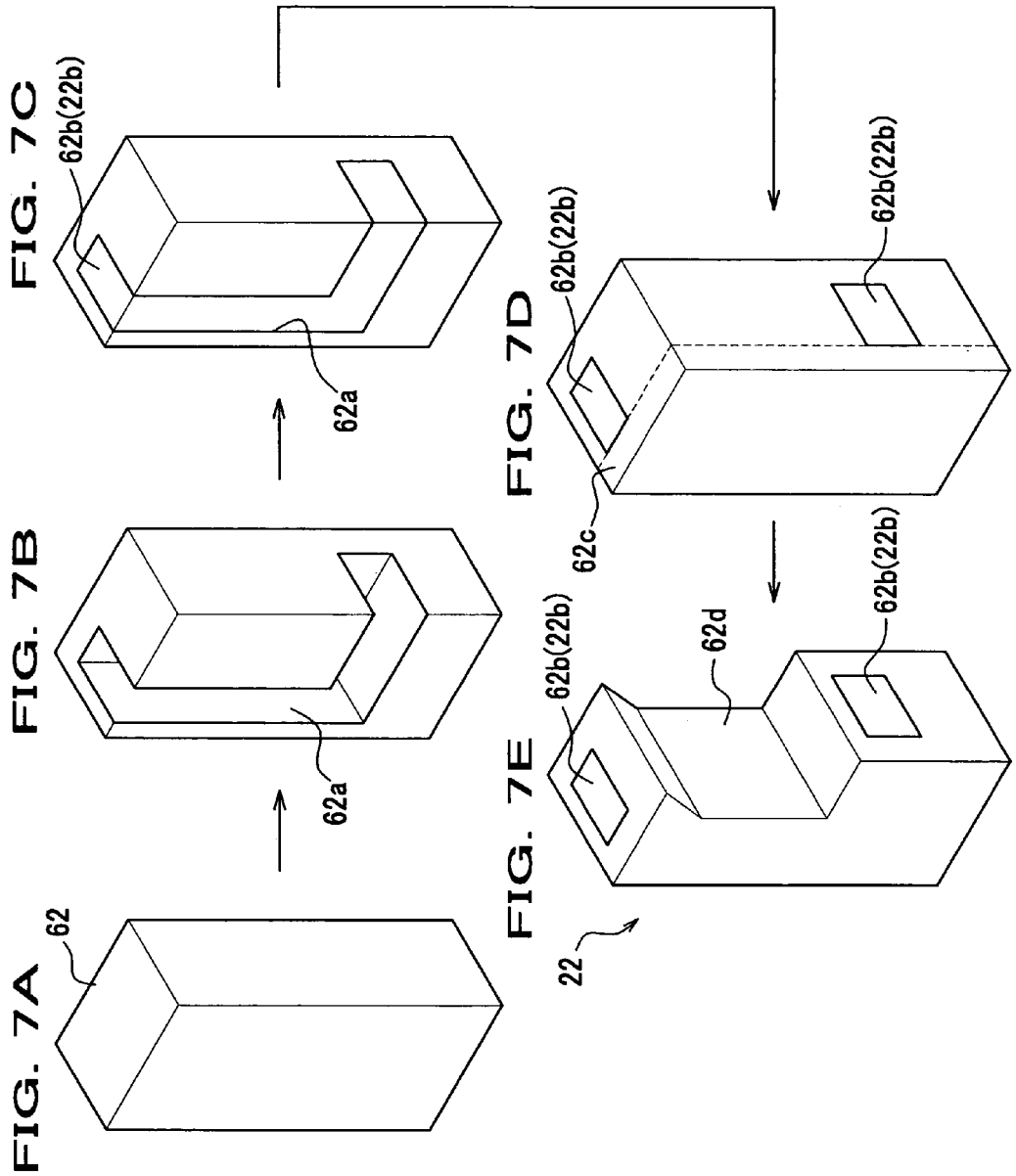

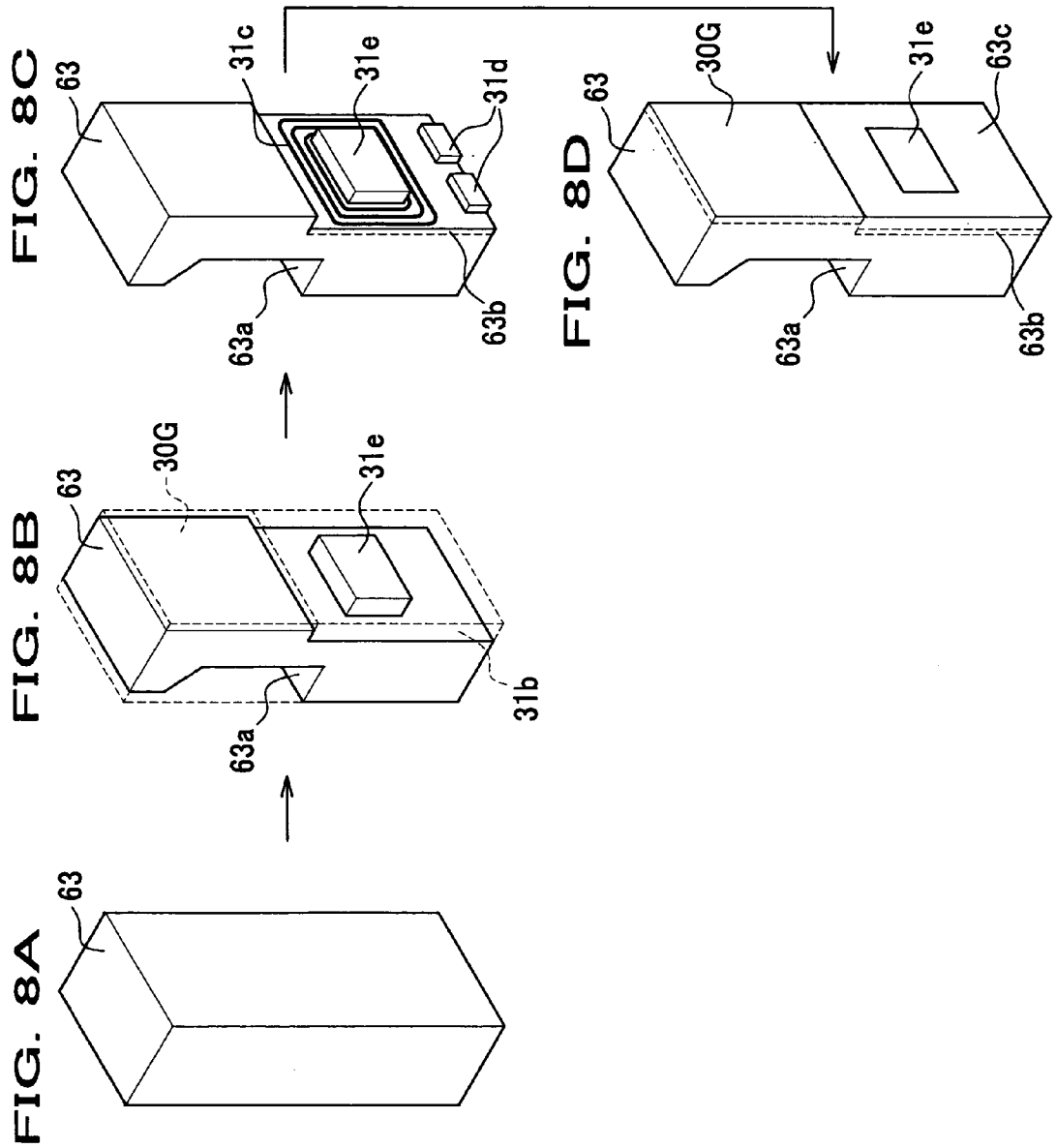

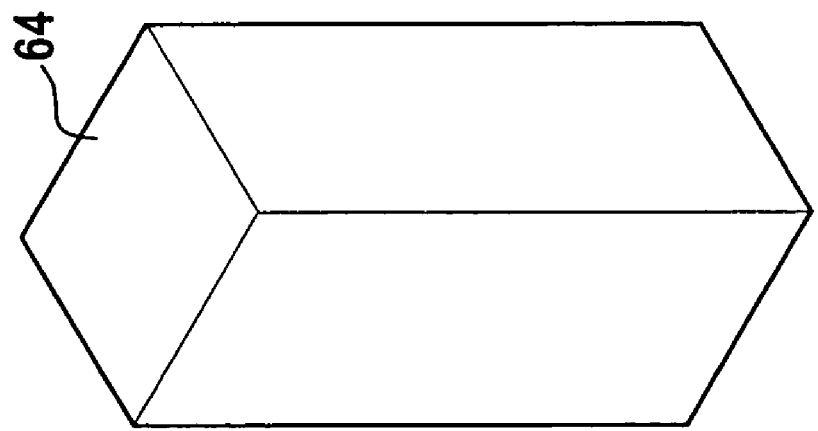
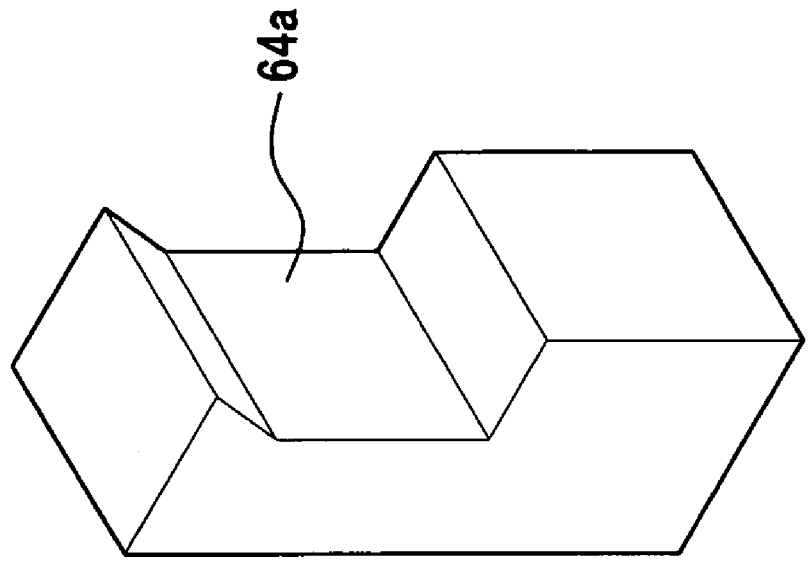

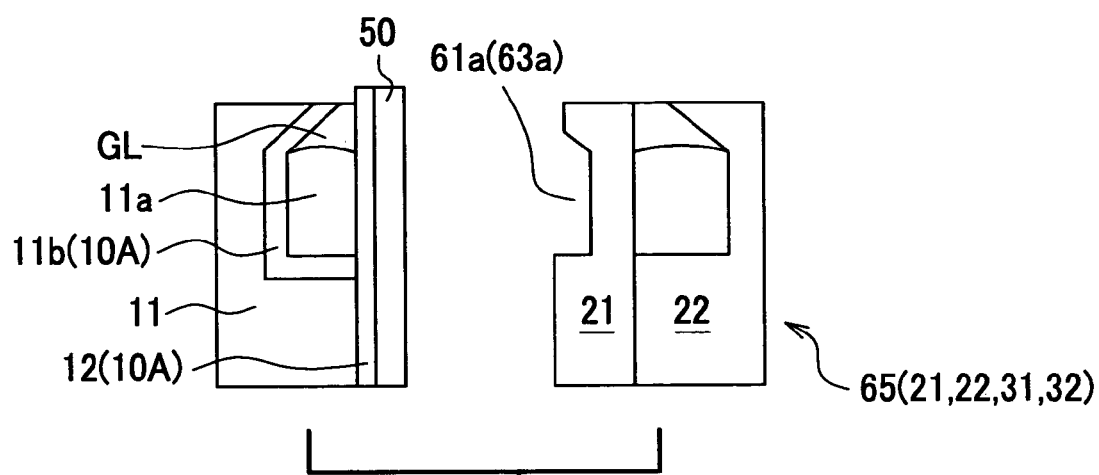
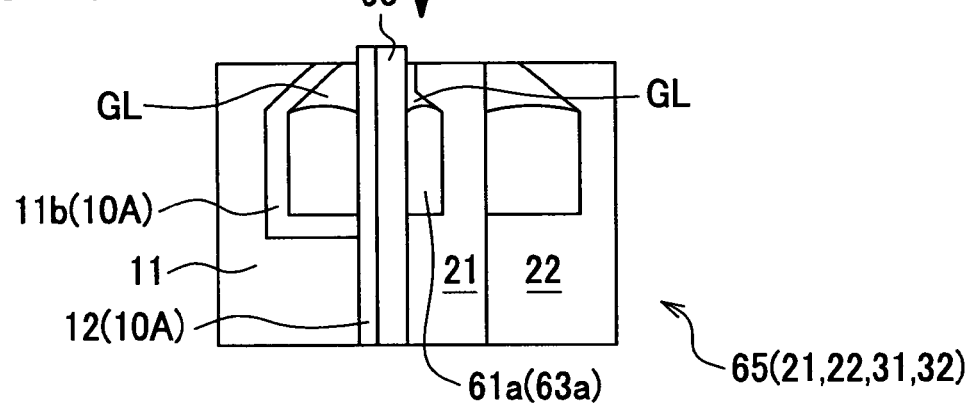

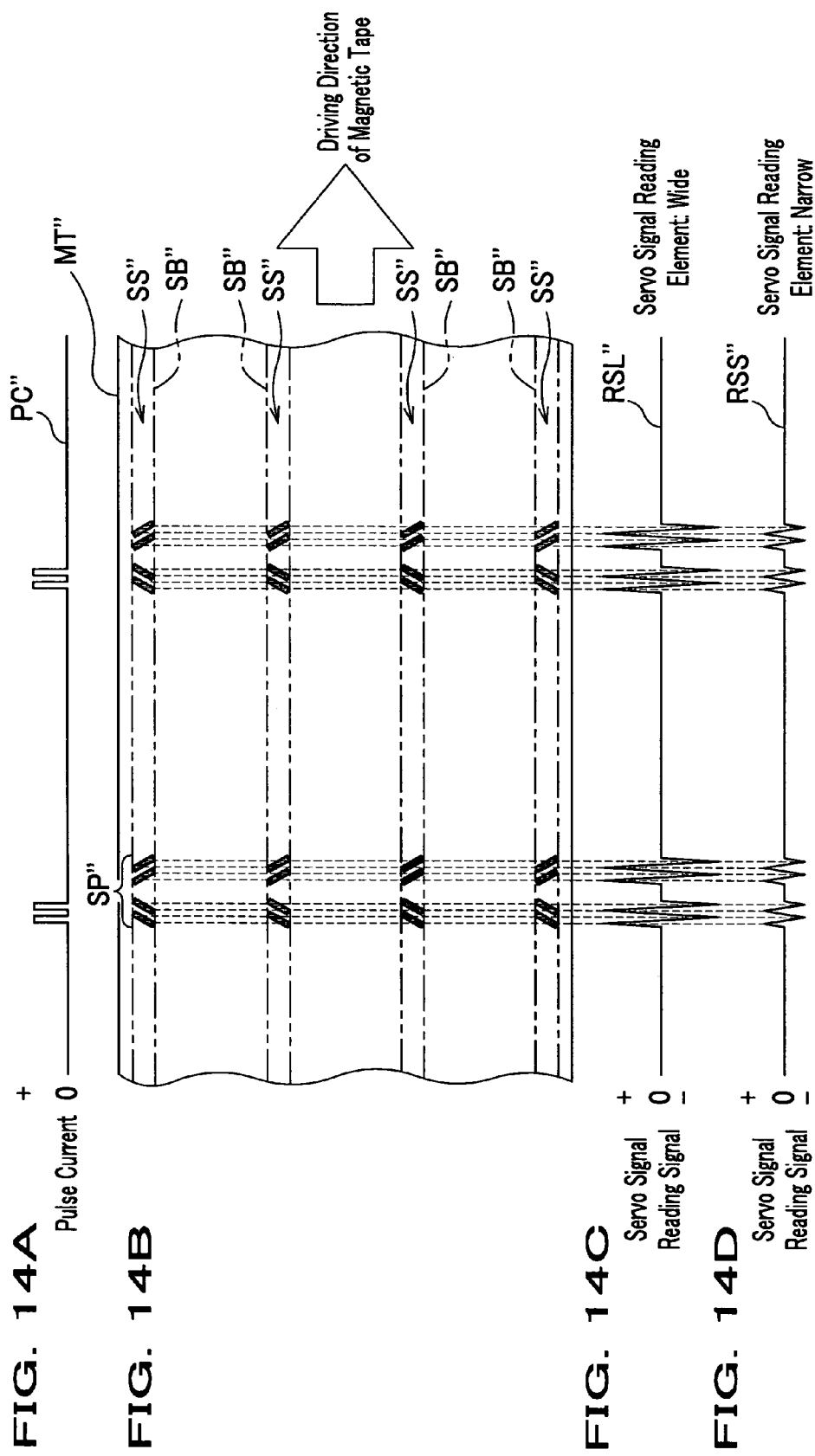

COMPOSITE MAGNETIC HEAD AND PROCESS FOR PRODUCING THE SAME

BACKGROUND ARTS

1. Field of the Invention

The present invention relates to a composite magnetic head having a servo head, which writes a servo signal on a magnetic tape, provided thereon, and to a process for producing the same, the disclosure of which is based on Japanese Patent Application No. 2003-405513, filed on Dec. 15, 2003.

2. Description of Relate Arts

In recent years, a magnetic tape has became high density for recording, and amongst the magnetic tape, there exists magnetic tapes for backing up a data for a computer has a capacity of approximately several hundreds Gigabits, In order to attain such a capacity, several hundreds of data trucks are formed on the magnetic tape in the width direction thereof. This makes the width of the truck of the magnetic tape very narrow, and a space between neighboring data trucks becomes also narrow. In such a case, in order to trace a recording/playing element possessed by the magnetic head onto the data truck, a servo signal has been previously recorded onto the magnetic tape, and the position of the magnetic tape (the position of the magnetic tape in the width direction) is servo-controlled, while reading the recorded servo signal by the magnetic head (see U.S. Pat. No. 5,689,384 corresponding to Japanese Patent Laid-Open No. 08-30942).

In the prior art, the servo band is recorded by applying a recording signal to the servo head so as to magnetize given areas on a servo band, which has not yet been magnetized, in one direction. Specifically, as shown in FIG. 14A, in order to avoid saturation of a servo signal reading element (MR element) in the servo band SS", a pulse current PC" comprising a zero current and a plus pulse current (hereinafter referred to as pulse current) is formed on a servo band SB", which has not yet been magnetized. As shown in FIG. 14B, upon using the pulse current PC", areas except for a servo pattern SP" of a magnetic tape MT" is not magnetized at a time when the pulse current is zero current, while the servo pattern SP" is magnetized in one direction due to a leakage magnetic flux from a servo writing gap at a time when the plus pulse current is run, which writes the servo signal SS" thereon as a result. On the other hand, in the conventional device for recording and playing a magnetic tape, a point for changing magnetization is detected by change in an electric resistance by a servo signal-reading element, and output the point for changing magnetization as differential wave form (voltage) as the reading signal. Consequently, as the electric resistance becomes larger, a peak voltage of the reading signal of the servo signal SS" becomes larger, enhancing an S/N ratio of the reading signal. Consequently, as shown in FIG. 14C, the reading signal RSL" of the servo signal SS" becomes large in the case where change in the magnetization of the servo signal SS" itself is large, or in the case where a reading area is large due to long width of the servo signal reading element.

It is, however, expected that the density of the magnetic tape will become much higher, i.e., as high as several Terabits. This will increase a number of data trucks and make the magnetic tape thinner. Accordingly, the amount of the magnetism, which can be detected at the time of reading the servo signal SS" is decreased, and the change in magnetization amount of the servo signal SS", which can be detected by the servo signal reading element, is decreased. Consequently, as shown in FIG. 14D, the peak voltage of a reading signal RSS" of the servo signal SS" is decreased, and the SN ratio of the reading signal RSS" is deteriorated. As a result, the servo signal SS" cannot be read out in the conventional device for recording and playing a magnetic tape in a precise manner, making it impossible to highly precisely control the position of the magnetic head.

An object of the present invention is, therefore, to provide a composite magnetic head, which can enhance the SN ratio of the reading signal of the servo signal and which can avoid the deterioration in the quality of data signal recorded on the data band, and another object of the present invention is to provide a process for producing such a composite magnetic head.

SUMMARY OF THE INVENTION

According to one aspect of the present invention, the present invention, there is provided a composite magnetic head comprising:

a DC-erasing head, which is slidably contact with a driving magnetic tape, and which DC-erases a servo band of said magnetic tape in such a manner that the direction of the magnetization of said servo band the servo band is directed towards one direction of the -lengthwise direction of said magnetic tape;

a servo writing head, which is slidably contact with said magnetic tape, and which writes a servo signal thereon so that the direction of the magnetization of the servo band is directed toward the reverse direction to the direction directed by the DC erasing head; and an AC-erasing head, which is contact with said magnetic tape, and which AC-erases the magnetization of the data band of said magnetic tape;

said servo writing head and said AC-erasing head being provided at downstream of the driving magnetic tape relative to the DC-erasing head, and said DC-erasing head, said servo writing head and said AC-erasing head being unified with each other.

According to another aspect of the present invention, there is provided a process for producing a composite magnetic head, the process comprising:

forming a core making up a DC-erasing head;

forming a core making up a servo writing head;

forming a core making up an AC-erasing head, and forming thereon an AC-head gap, which AC-erases the magnetization of a magnetic tape;

unifying the core of the DC-erasing head, the core of the servo writing head, and the core of the AC-erasing head with each other;

forming a DC-erasing gap, which DC-erases magnetization of a magnetic tape, on the core of the DC-erasing head; and forming a servo writing gap, which writes a servo signal on a magnetic tape, on the core of the servo writing head;

said DC-erasing gap and said servo writing gap being formed by a simultaneous patterning according to a photo-lithographic method utilizing a single mask.

BRIEF DESCRIPTION OF THE DRAWINGS

FIGS. 6A–F are drawings showing a process for producing a second base member making up the servo writing head.

FIGS. 7A–E are drawings showing a process for producing a third base member making up the servo writing head.

FIGS. 8A–D are drawings showing a process for producing a fourth base member making up the AC-erasing head.

FIGS. 9A–B are drawings showing a process for producing a fifth base member making up the AC-erasing head.

FIGS. 11A–C are drawings showing a process for joining the first base member, the second base member, the third base member, the fourth base member and the fifth base member with each other.

FIG. 14 is a drawing showing the magnetic tape on which a servo signal has been written by the conventional technique, wherein FIG. 14A shows a recording current at the time of writing the servo signal, FIG. 14B is a plane view of the magnetic tape, FIG. 14C shows the reading signal of the servo signal, when the recording element has a long width; and FIG. 14D shows reading signal of the servo signal, when the recording element has a short width.

DESCRIPTION OF PREFERRED EMBODIMENTS

[Composite Magnetic Head]

Figure 1:
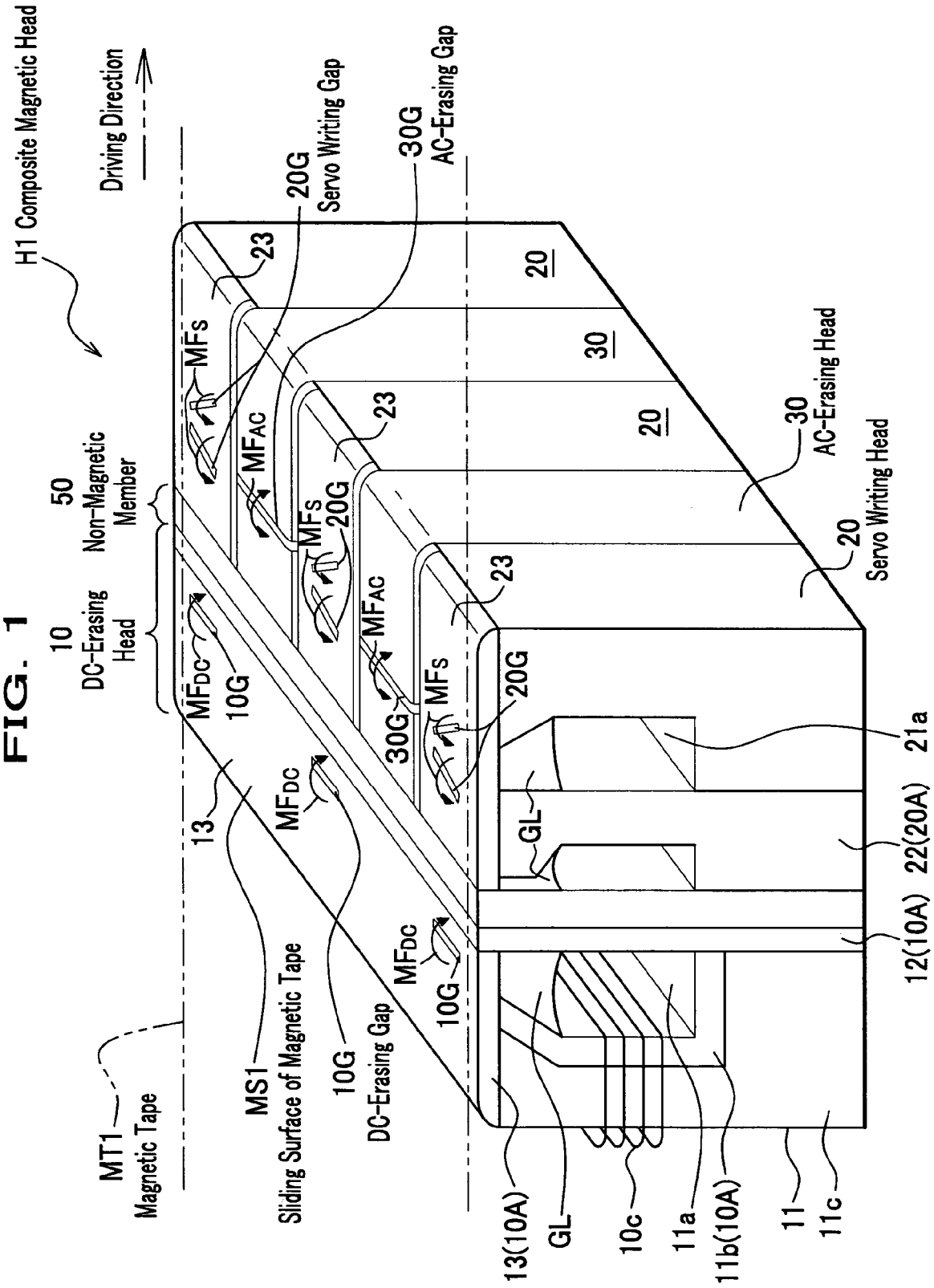
FIG. 1 is a perspective view totally showing a composite magnetic head according to one embodiment of the present invention.

Referring to the drawings, embodiments of the composite magnetic head according to the present invention will now be described. The composite magnetic head used herein is based on our previously suggested composite magnetic head comprising: a DC-erasing head, which is slidably contact with a driving magnetic tape, and which DC-erases a servo band of said magnetic tape in such a manner that the direction of the magnetization of said servo band the servo band is directed towards one direction of the lengthwise direction of said magnetic tape; a servo writing head, which is slidably contact with said magnetic tape, and which writes a servo signal thereon so that the direction of the magnetization of the servo band is directed toward the reverse direction to the direction directed by the DC erasing head; and an AC-erasing head, which is contact with said magnetic tape, and which AC-erases the magnetization of the data band of said magnetic tape, (Japanese Patent Application No. 2003-110396, not disclosed).

According to this composite magnetic head, since the servo signal is written so that the magnetization of the servo band is directed toward the reverse direction, an amount and a rate of changing the magnetic field at the servo signal portion become large, enhancing the SN ratio of the servo signal.

In this composite magnetic head, there is a possibility that a data band in adjacent to the servo band will undergo DC-erasing by the DC-erasing head depending on the situation of the magnetic tape provided on the composite magnetic head at the time of writing the servo signal on the servo band by such a composite magnetic head. Then, when a data signal is recorded on the DC-erased data band, a high frequency deformation may occur on the recorded data signal due to the DC-erasing, deteriorating the quality of data signal.

The composite magnetic head according to the present invention improves this situation.

As shown in FIG. 1, a composite magnetic head H1 is composed of a DC-erasing head 10, which is slidably contact with a magnetic tape MT1, and which DC-erases a servo band SB so that the direction of the magnetization M (see FIG. 4) of the servo band SB (see FIG. 4) of the magnetic tape MT1 is directed toward the driving direction of the magnetic tape MT1 (hereinafter referred to as "normal direction"), a servo writing head 20, which is slidably contact with the magnetic tape MT1, and which writes a servo signal SS on the servo band SB so that the direction of the magnetization M (see FIG. 4 )of the servo band SB is directed toward a reverse direction relative to the normal direction (hereinafter referred to as "reverse direction"), and an AC-erasing head 30, which is slidably contact with a magnetic tape MT1, and which AC-erases the magnetization (not shown) of the data band DB of the magnetic tape MT1 (see FIG. 4).

The composite magnetic head H1 possesses a plurality of the servo heads 20 and a plurality of the AC-erasing heads 30, and the servo heads 20 and the AC-erasing heads 30 are arranged so as to be alternatively aligned in the width direction of the magnetic tape MT1. These servo heads 20 and AC-erasing heads 30 are also arranged at the downstream side of the driving magnetic tape MT1 (hereinafter simply referred to as "downstream side"), and they are conjugated and unified with each other via non-magnetic element 50.

Figure 2:
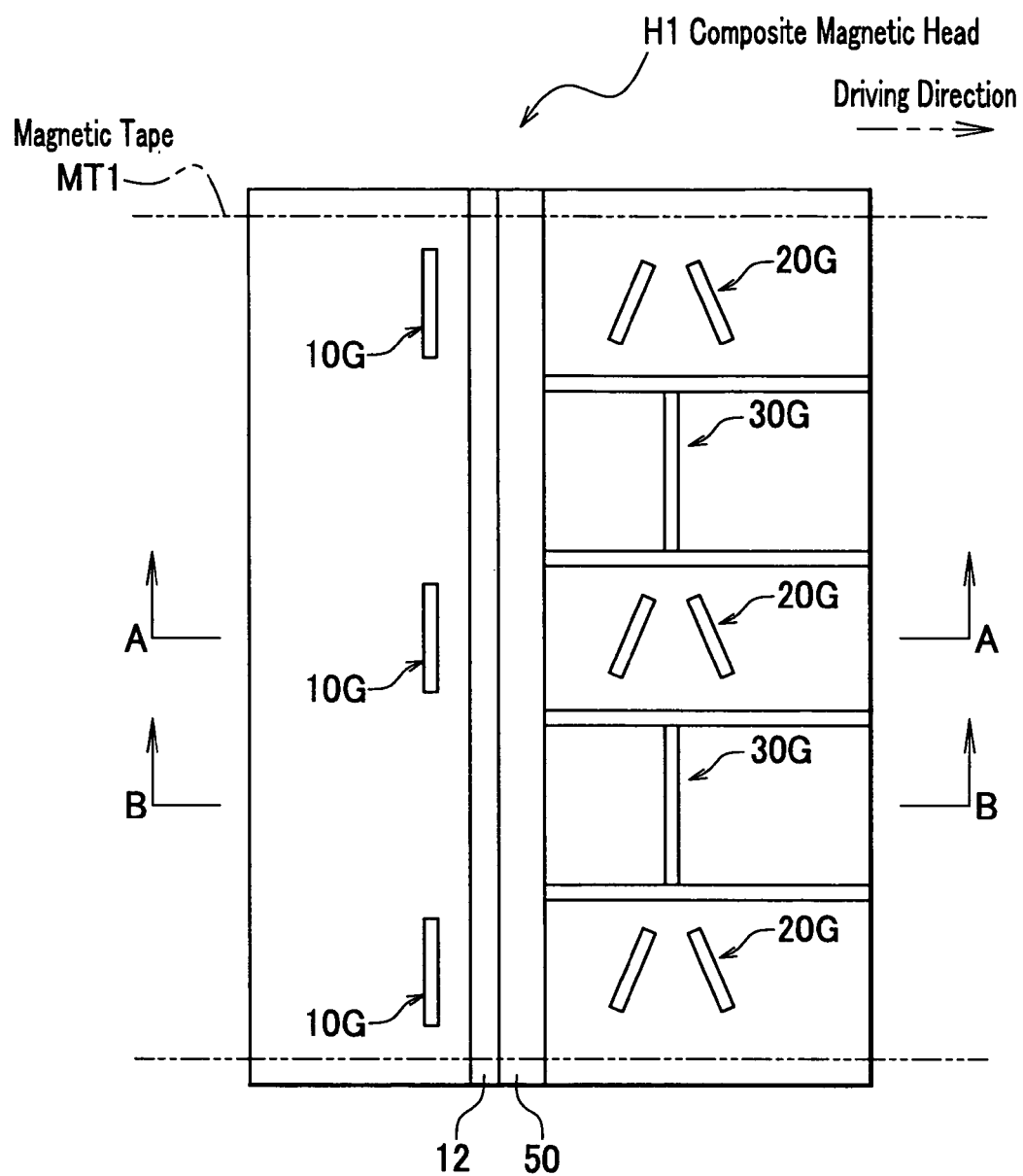
FIG. 2 is an upper end view of the composite magnetic head of FIG. 1.

In the composite magnetic head H1 having the DC-erasing head 10, the servo writing head 20 and the AC-erasing head 30 unified with each other as described above, a DC-erasing gap 10G, a servo writing gap 20G and an AC-erasing gap 30G are formed on sliding surface MS1 of the magnetic tape. As shown in FIG. 2, the servo writing gap 20G is formed so as to be aligned at a downstream side of the DC-erasing gap 10G in one line together with the DC-erasing gap 10G, and each AC-erasing gap 30G is formed so as to be sandwiched between the servo writing gaps 30G. As described later on, these DC-erasing gap 10G and the servo writing gap 20G are formed by the simultaneous photolithographically patterning utilizing a single mask.

The composite magnetic head makes up a servo writer which writes the servo signal SS on the servo band SB of the magnetic tape MT1 together with a driving system (not shown) such as a transferring reel, a take-up reel, and a guide rolls, a circuits (not shown) for imparting a DC current and a pulse current to the composite magnetic head H1, a current controller (not shown) for controlling the currents. The details of the DC-erasing head 10, the servo writing head 20 and the AC-erasing head 30 will be described hereinbelow.

(DC-Erasing Head)

As shown in FIG. 1, the DC-erasing head 10 is a head, which DC-erases the magnetization M (see FIG. 4) of portion corresponding to the servo band (see FIG. 4) of the magnetic tape MT1, and is composed of a first base member 11, a magnetic film 12 which is placed between the first base 11 and the non-magnetic element 50, and spread over one surface of the non-magnetic element 50, a surface magnetic film 13, and a coil 10c.

The first base member 11 possesses a coil groove 11a around which the coil 10c is wound, the coil groove 11a extends towards the width direction of the magnetic tape MT1. The first base member 11 possesses a non-magnetic portion 11c and a magnetic layer 11b which has been formed on an inner surface of the first base member 11 at the side of the coil groove 11a. In the magnetic portion 11b, one end is connected to the magnetic film 12 and the other end is connected to the surface magnetic film 13, which will be described.

The surface magnetic film 13 spreads over the first base member 11, and is magnetically connected to the magnetic layer 11b and the magnetic film 12. Onto the surface magnetic film 13, the DC-erasing gap 10G is formed so that the surface of the surface magnetic film 13 is exposed at a position corresponding to the portion of the servo band SB (see FIG. 4) of the magnetic tape MT1.

In the DC-erasing head 10, the magnetic layer 11b, the magnetic film 12, and the surface magnetic film 13 make up a core A. Specifically, in the DC-erasing head 10, a magnetic flux is induced by a DC current imparted to the coil 10c, and a leakage magnetic flux MFDC (see FIG. 1) in which the magnetic flux bypasses the DC-erasing gap 10G occurs at the sliding surface MS1 of the magnetic tape MT1.

Materials making up the non-magnetic portion 11c of the first base member 11 include, but are not restricted to, aluminum titanium carbide ($Al_2O_3.TiC$), non-magnetic ferrites, calcium titanate ($CaO.nTiO_2$), and silica ($SiO_2$). Materials for the magnetic layer 11b and magnetic film 12, and the surface magnetic film 13 may be soft magnetic materials including, but being not restricted to, soft magnetic Ni—Fe (nickel-iron) alloys called permalloy, sendust, alperm, and amorphous alloys. Materials for the DC-erasing gap 10G may be those similar to those for the non-magnetic portion 11c.

(Servo Writing Head)

Figure 3A:
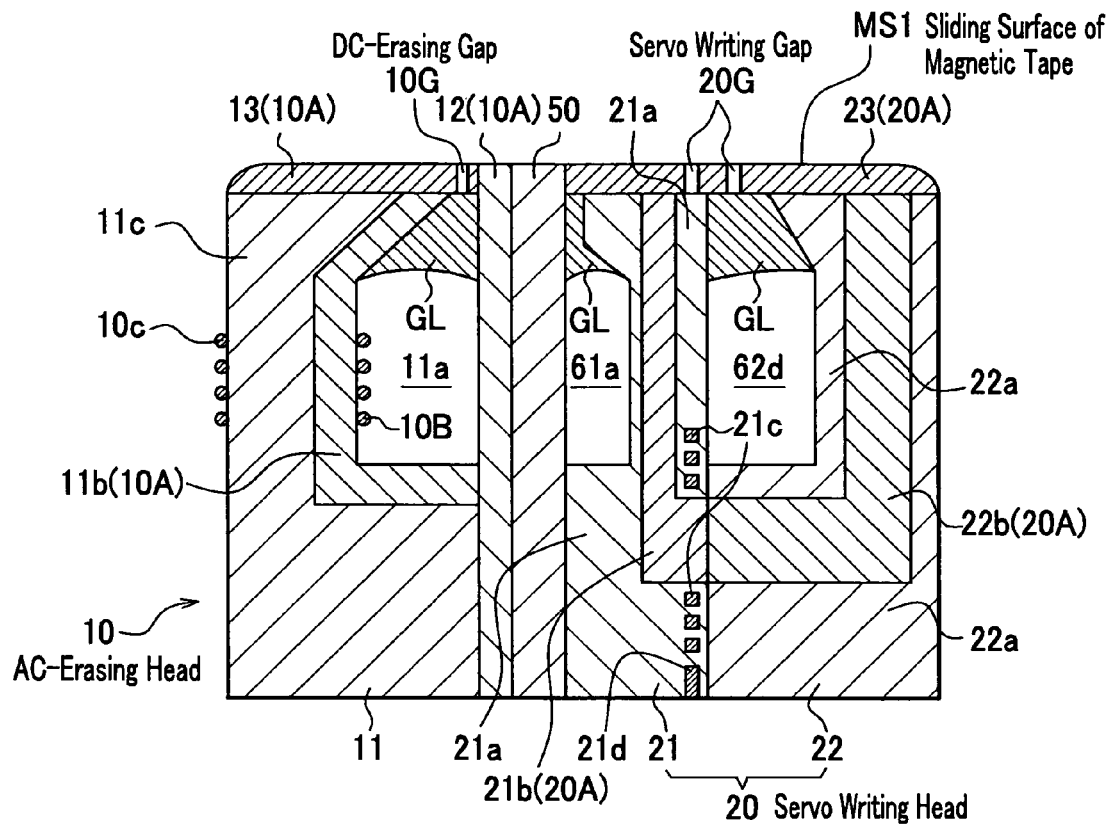
FIG. 3A is a cross-sectional view taken along the line A—A of FIG. 2.

The servo writing head 20 is a head for writing the servo signal SS (see FIG. 4) at a portion corresponding to the servo band SB (see FIG. 4) of the magnetic tape MT1 at a portion so that the magnetization M (see FIG. 4) of the servo band SB is directed towards the reverse direction, and as shown in FIG. 3A, is composed of a second base member 21, a third base member 22 conjugated with the second base member 21, and a surface magnetic film 23 formed on the third base member 22 at the side of the sliding surface MS1 of the magnetic tape.

The second base member 21 possesses a non-magnetic portion 21a and a magnetic portion 21b which is embedded into the non-magnetic portion 21a. The magnetic portion 21b is extend in an L-shape, one end of which is exposed at the side of the sliding surface MS1 of the magnetic tape within the non-magnetic portion 21a and is connected to the surface magnetic film 23, and the other end of which is exposed on the surface to be conjugated to the third base member 22.

The second base member 21 possesses a coil 21c which is embedded in the non-magnetic portion 21a and which is wound around the magnetic portion 21b. An electrode pad 21d, which is electrically connected to the coil 21c to be a terminal for supplying the recording current to the coil 21c, is provided on the second base member 21. To the electrode pad 21d is supplied a pulse current as the recording current from a current generator (not shown).

The third base member 22 possesses a non-magnetic portion 22a and a magnetic portion 22b which is embedded into the non-magnetic portion 22a. The magnetic portion 22b is extend in an L-shape, one end of which is exposed at the side of the sliding surface MS1 of the magnetic tape within the non-magnetic portion 22a and is connected to the surface magnetic film 23, and the other end of which is exposed on the surface to be conjugated to the magnetic portion 21b of the second base member 21.

On the surface magnetic film 23 is formed the servo writing gap 20G in such a manner that the surface thereof id exposed at a portion corresponding to the servo band SB (see FIG. 4) of the magnetic tape MT1. As shown in FIG. 2, the servo writing gap 20G have approximately reverse V shape (two parallel non-linear patterns) viewing from the plane (where the two gaps are not connected).

Again referring to FIG. 3A, in the servo writing head 20, the magnetic portion 21b of the second base member 21 and the magnetic portion 22b of the third base member 22b, and the surface magnetic film 23 make up a core 20A. Specifically, in the servo writing head 20, a magnetic flux is induced by a pulse current imparted to the coil 21c, and a leakage magnetic flux MFS (see FIG. 1) in which the magnetic flux bypasses the servo writing gap 20G occurs at the sliding surface MS1 of the magnetic tape MT1.

As materials for the non-magnetic portion 21a of the second base member 21 and the non-magnetic portion 22a of the third base member 22, those which have been mentioned as the materials for the non-magnetic portion 11a of the first base member 11 can be mentioned. Similarly, as materials for the magnetic portion 21b of the second base member 21, the magnetic portion 22b of the third base member 22, and the surface magnetic film 23, those similar to the materials for the magnetic layer 11b, the magnetic film 11c, and the surface magnetic film 13 of the DC-erasing head can be mentioned. Also, as materials for servo writing gap 20G, those similar to the materials for DC-erasing gap 10G of the DC-erasing head 10 can be mentioned.

(AC-Erasing Head)

Figure 3B:
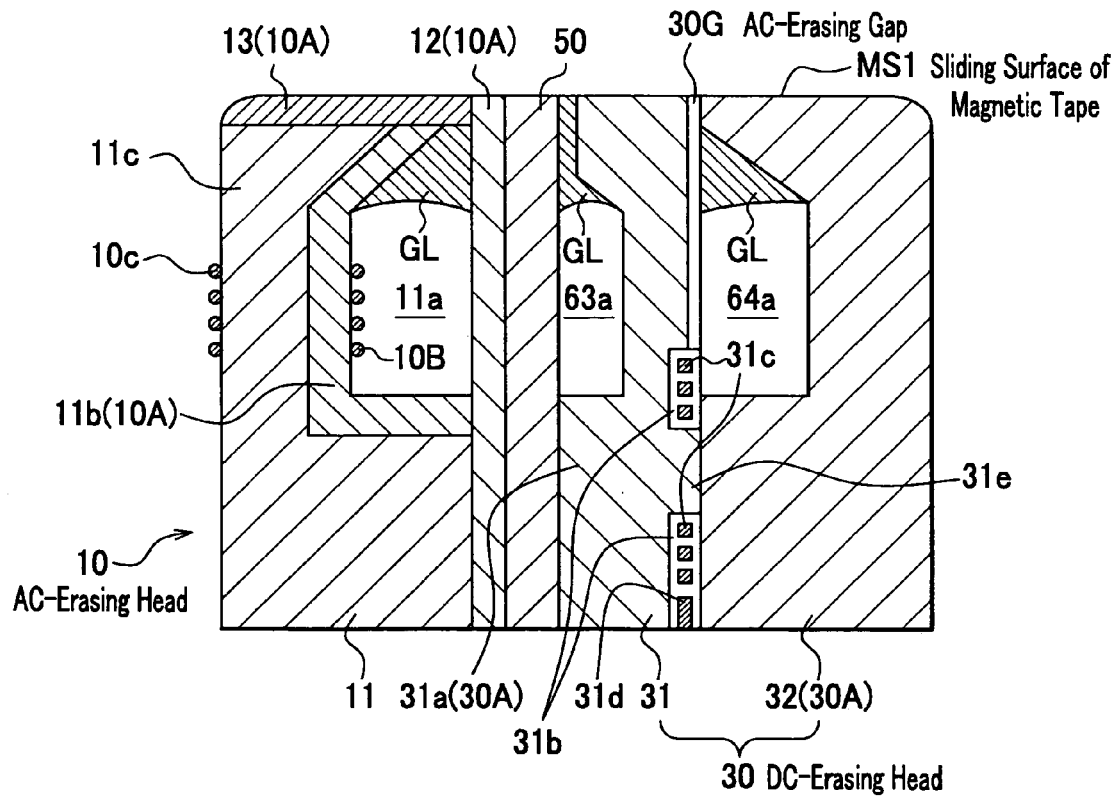
FIG. 3B is a cross-sectional view taken along the line B—B of FIG. 2.

The AC-erasing head 30 is a head, which AC-erases the magnetization M (see FIG. 4) of portion corresponding to the data band DB (see FIG. 4) of the magnetic tape MT1, and as shown in FIG. 3B, is composed of a fourth base member 31, and the fifth base member 32 conjugated with the fourth base member 31.

The fourth base member 31 possesses a magnetic portion 31a, a magnetic conjugation portion 31e, which is conjugated with the magnetic portion 31a and the fifth base member 32, and the AC-erasing gap 30G formed on the surface facing to the fifth base member 32 at an upper portion of the magnetic conjugation portion 31e.

A coil 31c for winding a magnetic conjugating portion 31e is provided on the fourth base member 31. Also, an insulation portion 31b, which surrounds the coil 31c and which embeds the coil 32 in the fourth base member 31, is provided on the fourth base member 31. An electrode pad 31d, which is electrically connected to the coil 31e to be a terminal for supplying an alternation current to the coil 31c, is provided on the fourth base member 31. To the electrode pad is supplied the alternation current from a current generator (not shown).

The fifth base member 32 is connected to the magnetic portion 31a of the fourth base member 31 at the magnetic conjugation portion 31e, and is facing to the fourth base member 31 via the AC-erasing gap 30G at the sliding surface MS1 of the magnetic tape.

The AC-erasing gap 30A is exposed on the sliding surface MS1 of the magnetic tape MT1 so as to correspond to a portion of the data band DB (see FIG. 4) of the magnetic tape MT1. In the AC-erasing head 30 described above, the magnetic portion 31a of the fourth base member 31, the magnetic conjugation portion 31e of the fourth base member 31, and the fifth base member 32 make up a core 30A. Specifically, in the AC-erasing head 30, a magnetic flux is induced at the core 30A by an alternation current imparted to the coil 31c, and a leakage magnetic flux MFAC (see FIG. 1) in which the magnetic flux bypasses the AC-erasing gap 30G occurs at the sliding surface MS1 of the magnetic tape MT1.

As materials for the magnetic portion 31a of the fourth base member 31, the magnetic conjugation portion 31e of the fourth base member, and the fifth base member 32, those similar to the materials for the magnetic layer 11b, the magnetic film 11c, and the surface magnetic film 13 of the DC-erasing head can be mentioned. As materials for insulation portion 31b of the fourth base member 31, those similar to the materials for the non-magnetic portion 11c of the first base material 11. Also, as materials for the AC-erasing gap 30G, those similar to the materials for DC-erasing gap 10G of the DC-erasing head 10 can be mentioned.

(Non-magnetic Material)

The non-magnetic element 50 is made of a non-magnetic material, and serves as magnetically insulating the DC-erasing head 10 with the servo writing head 20, and the AC-erasing head 30. On surface of the non-magnetic element 50 is formed the magnetic film 12 making up the core A of the DC-erasing head (see FIG. 1).

As materials for the non-magnetic element 50, those similar to the materials for the non-magnetic portion 11c of the first base member 11 can be mentioned.

Subsequently, the operation of the composite magnetic head according to this embodiment will be described by referring to the drawing. FIG. 4 shows the situation of magnetization of a magnetic tape by the composite magnetic head according to one embodiment of the present invention. FIG. 4 partially shows an upper end portions in the width direction of the magnetic tape.

Figure 4:
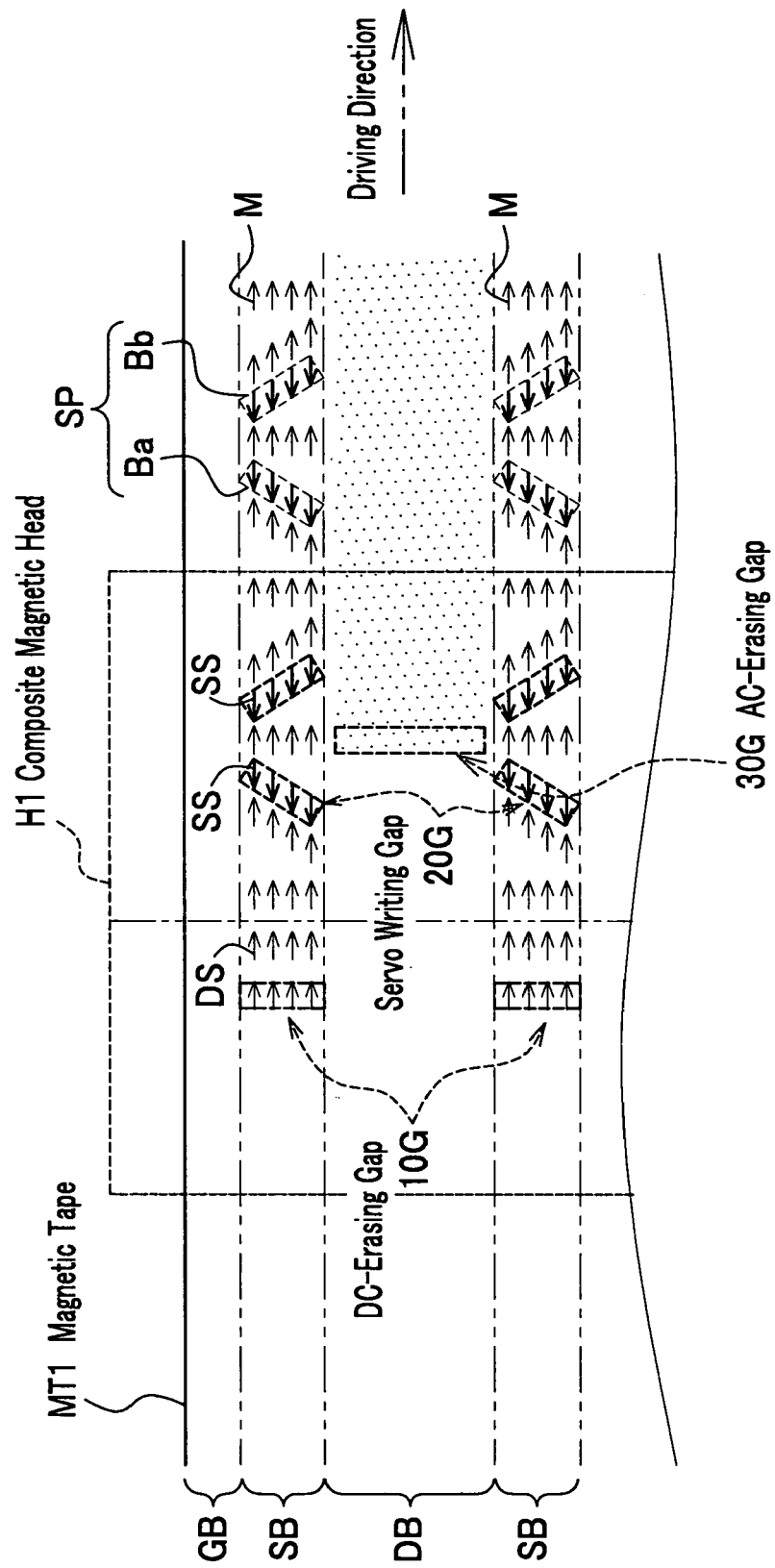
FIG. 4 shows the situation of magnetization of a magnetic tape by the composite magnetic head according to one embodiment of the present invention.

As shown in FIG. 4, the magnetic tape MT1 drives along the sliding surface MS 1 of the magnetic tape of the composite magnetic head H1 (see FIG. 1) so that the servo writing gap 20G and the AC-erasing gap 30G are positioned at the downstream side of the DC-erasing gap 10G.

First, a stage for DC-erasing the servo band SB so that the DC-erasing gap 10G at the upstream side directs the direction of the magnetization M of the servo band SB towards the normal direction will be explained mainly referring to FIG. 4.

When a DC current is imparted to the coil 10c from the current generator (not shown), the coil 10c induces a magnetic flux traveling through the core 10A shown in FIG. 1. The magnetic flux bypasses the DC-erasing gap 10G (see FIG. 1) partially formed on the surface magnetic film 13 (see FIG. 1), and a leakage magnetic flux MFDC (see FIG. 1) occurs on the sliding surface MS1 of the magnetic tape MT1 (see FIG. 1). The direction of the leakage magnetic flux MFDC is reversed depending upon the polarity of the DC current running through the coil 10c. In this embodiment, the DC current is imparted so that the leakage magnetic flux MFDC is directed toward the normal direction.

The servo band SB is DC-erased by the leakage magnetic flux MFDC so that the direction of the magnetization M is directed toward the normal direction.

Next, a stage in which the servo writing head 20 at the downstream side writes the servo signal SS will be described mainly referring to FIG. 4.

When a pulse current is imparted from the current generator (not shown) to the coil 21c (see FIG. 3A), the coil 21c induces a magnetic flux traveling through the core 20A shown in FIG. 3A. The magnetic flux bypasses the servo writing gap 20G (see FIG. 3A) partially formed on the surface magnetic film 23 (see FIG. 3A), and a leakage magnetic flux MFS (see FIG. 1) occurs on the sliding surface MS1 of the magnetic tape MT1 (see FIG. 1). The direction of the leakage magnetic flux MFS is reversed depending upon the polarity of the pulse current running through the coil 21c. In this embodiment, the pulse current is imparted so that the leakage magnetic flux MFS is directed toward the reverse direction. The servo signal SS is written on the servo band SB so as to direct the direction of the magnetization M towards the reverse direction.

At this time, the servo writing gap 20G is placed at the side of downstream of the DC-erasing gap 10G, and the DC-erasing gap 10G and the servo writing gap 20G are arranged so as to aligned in traverse one line. Accordingly, the servo writing gap 20G writes the servo signal SS on the servo band SB having been DC-erased without any gap. Also, the composite magnetic head according to this embodiment, since the DC-erasing gap 10G and the servo writing gap 20G are formed simultaneously by a lithographic method utilizing a single mask, the alignment of the DC-erasing gap 10G and the servo writing gap 20G is made with high precision, and thus, the servo writing gap 20G can write the servo signal SS on the servo band SB with high precision.

The servo signal SS forms a burst Ba, which is a magnetized portion having a positive slanting angle relative to the driving direction of the magnetic tape MT1 and a burst Bb, which is a magnetized portion having a negative slanting angle relative to the driving direction of the magnetic tape MT1 by the servo gap 20G having a reverse V shape (two non-parallel non-linear patterns). A set of the burst Ba and the burst Bb makes up one servo pattern SP. Furthermore, imparting a pulse current at a given interval, the servo pattern SP is repeated in the lengthwise direction of the magnetic tape MT1.

Next, a stage where the AC-erasing gap 20G AC-erases the magnetization of the data band DB will be described mainly referring to FIG. 4.

When an alternation current is supplied from the current generator (not shown) to the coil 31c (see FIG. 3B), the coil 31c induces a magnetic flux transmitting the coil 31c shown in FIG. 3B. The magnetic flux bypasses the AC-erasing gap 30G (see FIG. 3B), and a leakage magnetic flux MFac occurs on the sliding surface MS1 of the magnetic tape (see FIG. 1). Then, the magnetization (not shown) of the data band DB is AC-erased by the leakage magnetic flux MFac.

At this time, since the AC-erasing gap 30G is placed at the side of downstream of the DC-erasing gap 10G, and the AC-erasing gap 30G AC-erases the data band DB, even if the data band DB is DC-erased by the DC-erasing gap 10G for example, depending upon the situation of the magnetic tape provided on the composite magnetic tape MT1. As a result, since DC-erasing of the data band DB is avoided, even if a data signal is recorded on the data band DB of the magnetic tape MT1 afterward, the no high frequency deformation due to the DC-erasing of the data band DB occurs on the recorded data signal. Consequently, according to this composite magnetic head, the deterioration in the quality of the data signal recorded on the data band can be avoided.

[Process for Producing Composite Magnetic Head]

Figure 5C:
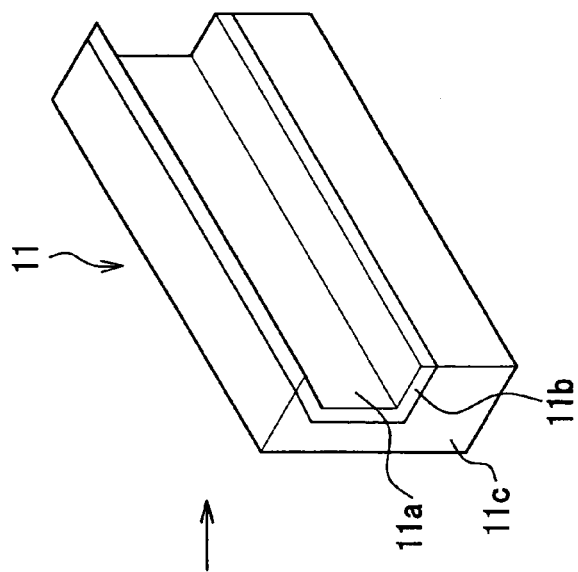
FIGS. 5A–C are drawings showing a process for producing a first base member making up the DC-erasing head.
Figure 5B:
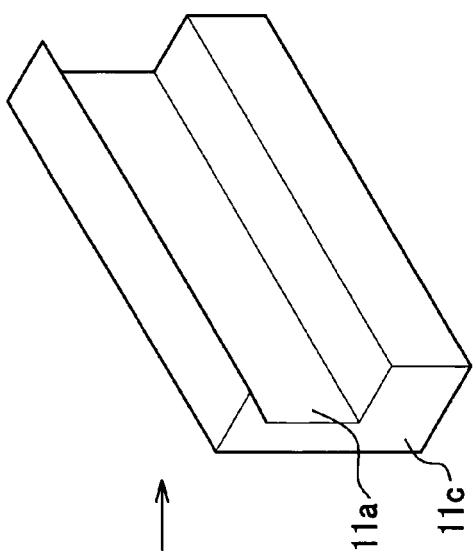
Figure 10:
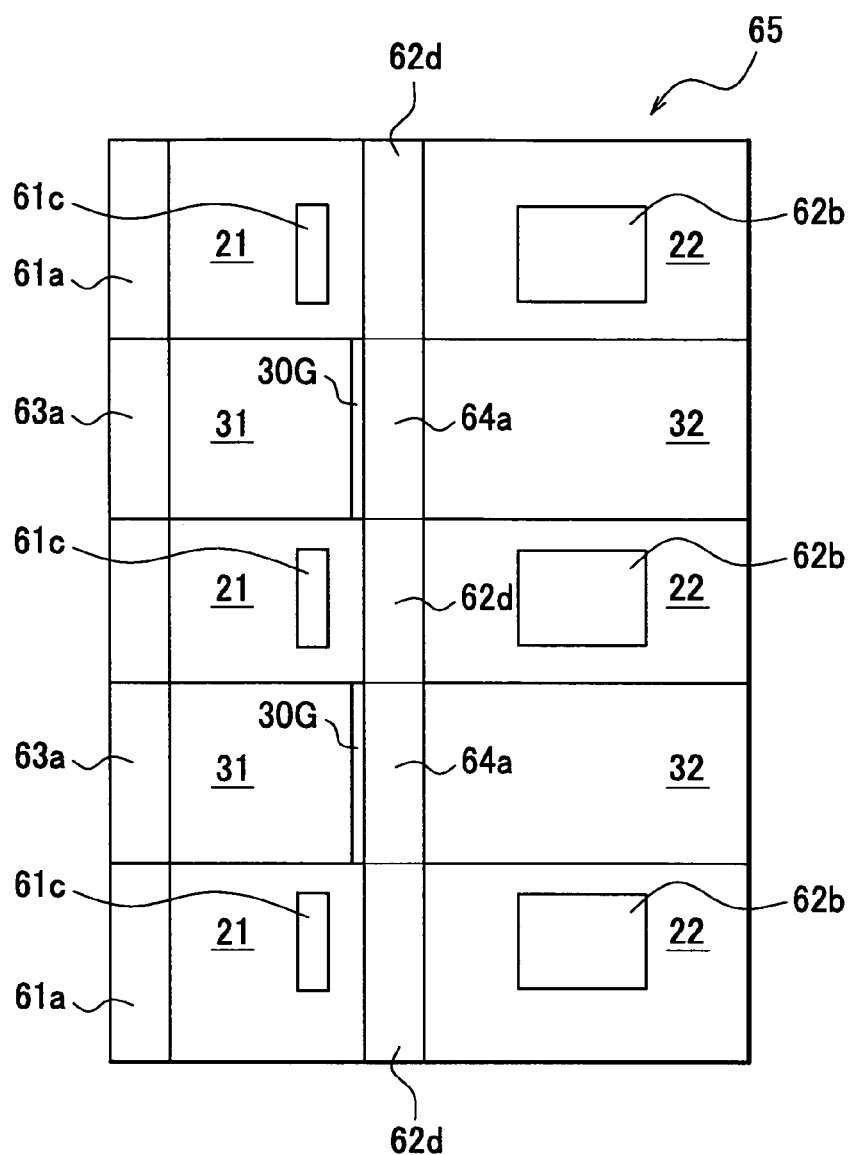
FIG. 10 is an upper end view showing an unified block combining the second base member, the third base member, the fourth base member and the fifth base member with each other.
Figure 12:
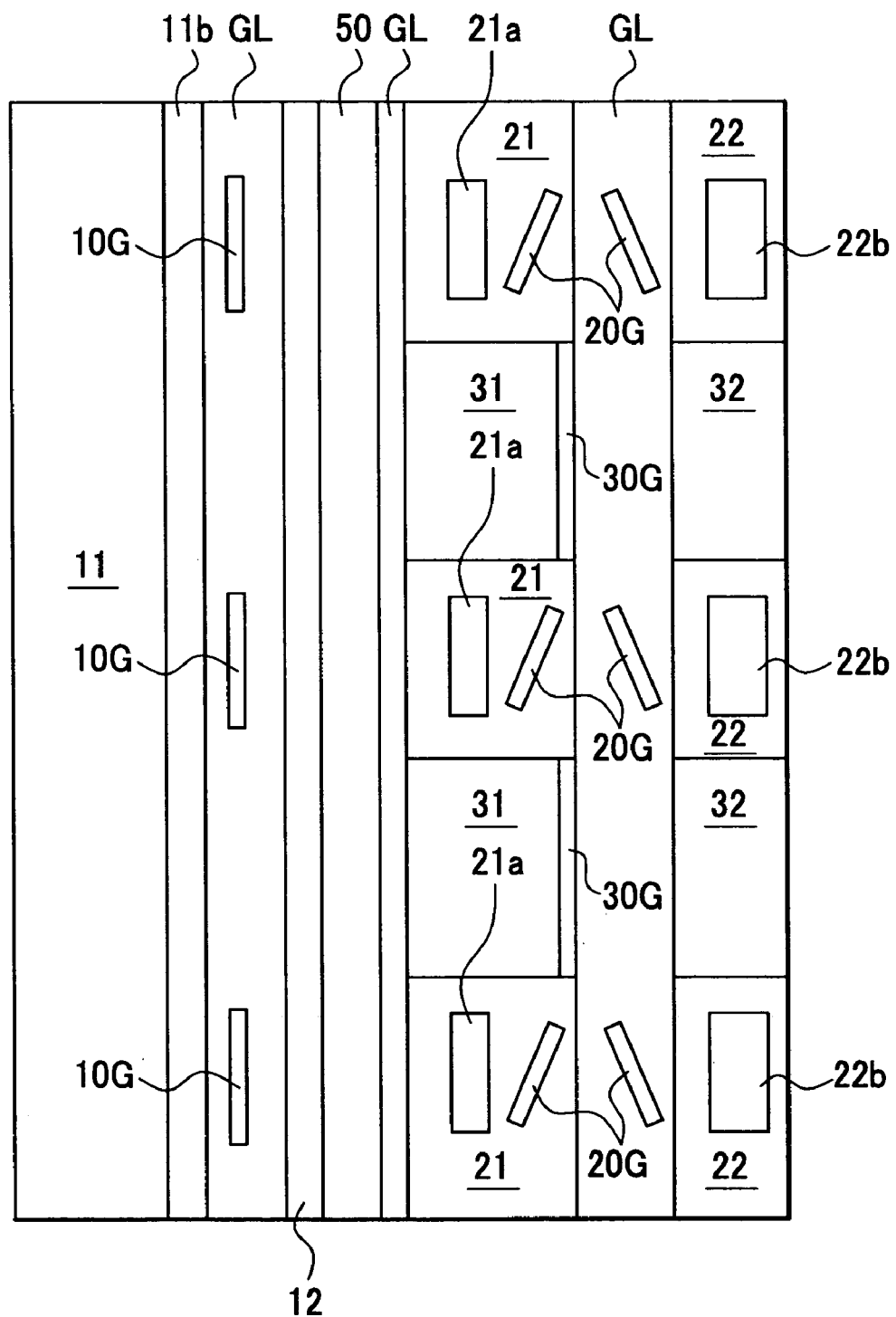
FIG. 12 shows a layout of the DC-erasing head, the servo writing gap, and the AC-erasing head.
Figure 13:
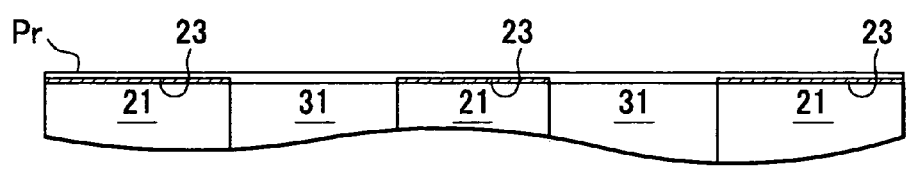
FIG. 13 is a schematic view showing the composite magnetic head on which a protective film has been formed.

Next, the process for producing the composite magnetic head according to this embodiment will be described by referring to the drawings. In the drawings to be referred, FIG. 5 is a drawing showing a process for producing a first base member making up the DC-erasing head; FIG. 6 is a drawing showing a process for producing a second base member making up the servo writing head; FIG. 7 is a drawing showing a process for producing a third base member making up the servo writing head; FIG. 8 is a drawing showing a process for producing a fourth base member making up the AC-erasing head; FIG. 9 is a drawing showing a process for producing a fifth base member making up the AC-erasing head; FIG. 10 is an upper end view showing an unified block combining the second base member, the third base member, the fourth base member and the fifth base member with each other; FIG. 11 is drawing showing a process for joining the first base member, the second base member, the third base member, the fourth base member and the fifth base member with each other;

FIG. 12 shows a layout of the DC-erasing head, the servo writing gap, and the AC-erasing head; and FIG. 13 is a schematic view showing the composite magnetic head on which a protective film has been formed.

In the process for producing the composite magnetic head H1, the first base member 11 (see FIG. 3A) making up the DC-erasing head 10, the second base member 21 (see FIG. 3A) and the third base member 22 (see FIG. 3B) making up the servo writing head 20, and the fourth base member 31 (see FIG. 3B) and the fifth base member 32 (see FIG. 3B) making up the AC-erasing head 30 are individually produced.

(Stage for Producing First Base Member)

Figure 5A:
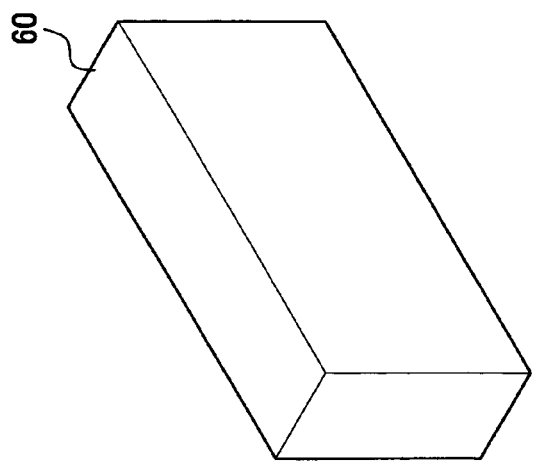

In the stage for producing the first base member 11 (see FIG. 3A), the non-magnetic part 11c (see FIG. 3A) of the first base member 11 is produced. As shown in FIG. 5, the non-magnetic part 11c is produced by cutting off a portion corresponding to the coil groove 11a from a rectangular parallelepiped member 60 (see FIG. 5A) made of a non-magnetic material. The portion corresponding to the coil groove 11a (shaved portion) may be cut off, for example, by mechanical shaving or such. Subsequently, the magnetic layer 11b (see FIG. 5C) making up the core 10A of the DC-erasing head is formed on the shaved portion. Any of the known thin-film formation methods such as sputtering is applicable to the formation of the magnetic layer 11b. The stage for producing the first base member 11 is thus completed by the formation of the magnetic layer 11b on the magnetic layer 11c.

(Stage for Producing Second Base Member)

In the stage for producing the second base member 21 (see FIG. 3A), the non-magnetic part 21c (see FIG. 3A) of the second base member 21 is produced. As shown in FIG. 6, the non-magnetic part 21c is produced by cutting off a portion corresponding to a groove 61a (see FIG. 6B) and a groove 61b (see FIG. 6B) for embedding a part of the magnetic portion 21a (see FIG. 3A) a rectangular parallelepiped member 61 (see FIG. 6A) made of a non-magnetic material as described above.

The groove 61a is a member for making a conjugation of the non-magnetic member 50 with the non-magnetic portion 21a by means of glass GL (see FIG. 3A), which will be described later on, easy, and is formed by cutting off one side surface of the rectangular parallelepiped member 61 in a horizontal direction. The groove 61b is formed on the surface opposite the surface on which the groove 61a is formed so that the groove 61 extends at an approximately center of the rectangular parallelepiped member 61 and faces to the upper end of the rectangular parallelepiped member 61. The grooves 61a and 61b may be cut off, for example, by mechanical shaving or such.

Subsequently, a magnetic material 61c (see FIG. 6C) is embedded into the groove 61 to form a part of the magnetic portion 21b (see FIG. 3A). The magnetic material 61 is made of the soft magnetic material described above. To the embedding of the magnetic material 61c, sputtering method utilizing the soft magnetic material as described above as a target may be applied. A projection portion 61d (see FIG. 6D) made of a soft magnetic material is formed on a lower end of the magnetic material 61c. The projection portion 61d is formed by a thin film formation method such as sputtering, and is unified with the magnetic material 61c to make up the magnetic portion 21b. The magnetic portion 21b makes up the core 20A (see FIG. 3A) of the servo writing head 20.

Subsequently, a non-magnetic film 61e (see FIG. 6E) making up the above-mentioned non-magnetic material is formed on the rectangular parallelepiped member 61 so as to cover the magnetic material 61c. On the non-magnetic film 61e, the coil 21c (see FIG. 6E) is formed so as to be wound around the projection portion 61d, and the electrode pad 21d (see FIG. 6E) is also formed, which is electrically connected with the coil 21c. The methods for forming the coil 21c and the electrode pad 21d are not restricted as long as they are method for forming a thin film such as copper, and examples include sputtering methods and electrolytic plating methods. A non-magnetic film 61f (see FIG. 6F) is formed by embedding the coil 21c and the electrode pad 21d on the non-magnetic film 61e, whereby the stage for producing the second base member 21 is completed.

(Stage for Producing Third Base Member)

In the stage for producing the third base member 22 (see FIG. 3A), as shown in FIG. 7, a groove 62a (see FIG. 7B) for embedding the magnetic portion 22b (see FIG. 3A) is cut off from a rectangular parallelepiped member 62 (see FIG. 7A) made of a non-magnetic material as described above. The groove 62a is formed so as to extend in an L-shape within the rectangular parallelepiped member 62, one end of which faces to an upper end of the rectangular parallelepiped member 62, and the other end of which faces to one side of the rectangular parallelepiped member 62. The groove 62 may be formed, for example, by shaving the rectangular parallelepiped member 62 by mechanical saving or such.

Subsequently, a non-magnetic material 62b (see FIG. 7C) is filled with the groove 62 to thereby form the magnetic portion 22b (see FIG. 3A). Specifically, the magnetic portion 22b is formed so that one end of thereof faces to an upper end of the rectangular parallelepiped member 62, and the other end thereof faces to one side of the rectangular parallelepiped member 62. The magnetic portion 22b makes up the core 20A (see FIG. 3A) of the servo writing head 20. The magnetic material 62b is made of the above-mentioned soft magnetic material. In order to fill the groove 62a with the magnetic material 62b, a sputtering method utilizing the soft magnetic material as a target or other method may be applied.

Subsequently, a non-magnetic film 62c (see FIG. 7D) is formed on the rectangular parallelepiped member 62 so as to cover the magnetic material 62c. In order to form the non-magnetic film 62, a sputtering method utilizing the non-magnetic material as a target or other method may be applied.

Subsequently, a groove 62d is formed on one surface of the rectangular parallelepiped member 62 facing to the magnetic portion 22b.

The groove 62d is a member for making a conjugation of the non-magnetic portion 21a with the non-magnetic portion 21a of the second base member 21 by means of glass GL (see FIG. 3A), which will be described later on, easy, and is formed by cutting off one side surface of the rectangular parallelepiped member 62 in a horizontal direction. After the groove 62d is formed as described above, the stage for producing the third base member is completed. The groove 62d may be cut off, for example, by mechanical shaving or such.

(Stage for Producing Fourth Base Member)

In the stage for producing the fourth base member 31 (see FIG. 3A), as shown in FIG. 7, the magnetic portion 31a (see FIG. 3A) of the fourth base member 31 is first produced. As shown in FIG. 8, a groove 63a (see FIG. 8B) is cut off from a rectangular parallelepiped member 63 (see FIG. 8A) made of the non-magnetic material, a portion for forming the insulation portion 31b (see FIG. 8B) at the circumference of a portion corresponding to the magnetic conjugation portion 31e (see FIG. 3B) is cut off therefrom. Then, at an upper portion of the shaved magnetic conjugation portion 31e, a portion for forming the AC-erasing gap (see FIG. 8B) is cut off. The groove 63a is a member for making a conjugation of the non-magnetic member 50 with the non-magnetic portion 21a by means of glass GL (see FIG. 3A), which will be described later on, easy. The groove 63a is formed by cutting off one side surface of the rectangular parallelepiped member 63 in a horizontal direction so that the height of groove 61a of the second base member 21 in the horizontal direction is accorded with the height of the groove 63a in the horizontal direction when the second base member 21 is combined with the fourth base member 31 afterward. The groove 63a may be cut off from the rectangular parallelepiped member 63, for example, by mechanical shaving or such. The rectangular parallelepiped member 63 whose unnecessary portions have been cut off as described above makes up the core 30A of the AC-erasing head 30 (see FIG. 3B).

Subsequently, on the surface of the rectangular parallelepiped member 63 from which the portion 31 for forming the insulation portion 31b, a non-magnetic film 63b (see FIG. 8C) made of the non-magnetic material is formed. On the non-magnetic film 63b, the coil 31c (see FIG. 8C) is formed so as to be wound around the magnetic conjugation portion 31e, and the electrode pad 31d (see FIG. 8C) is also formed, which is electrically connected with the coil 31c. The methods for forming the coil 31c and the electrode pad 31d, which can be used, are those similar to those for forming the coil 21c and the electrode pad 21d. A non-magnetic film 63c (see FIG. 8D) for embedding the coil 31c and the electrode pad 31d on the non-magnetic film 63b is formed and the AC-erasing gap 30G (see FIG. 8D) is formed, whereby the stage for producing the fourth base member 31 is completed.

(Stage for Producing Fifth Base Member)

As shown in FIG. 9, the fifth base member 32 (see FIG. 3B) is produced by cutting off a groove 64a (see FIG. 9A) from a rectangular parallelepiped member 64 (see FIG. 9A) made of the non-magnetic material. The groove 64d is a member for making a conjugation of the magnetic portion 31a (see FIG. 3B) of the fourth base member 31 with the fifth base member 32 by means of glass GL (see FIG. 3A), which will be described later on, easy. The groove 63 is formed by cutting off one side surface of the rectangular parallelepiped member 64 in a horizontal direction, so that the height of groove 62a of the third base member 22 in the horizontal direction is accorded with the height of the groove 63a in the horizontal direction when the third base member 22 is combined with the fifth base member 32 afterward. The groove 63a may be cut off from the rectangular parallelepiped member 64, for example, by mechanical shaving or such. The rectangular parallelepiped member 64 whose unnecessary portions have been cut off as described above makes up the core 30A of the AC-erasing head 30 (see FIG. 3B).

(Stage for Conjugating First to Fifth Base Members)

In a conjugation stage, three second base members 21, three third base members 22, two fourth members 31 and two fifth members 32 are prepared. Next, as shown in FIG. 10, the second base member 21 and the third base member 22 are placed so that the opposite side of the groove 61a of the second base member 21 and the side of the groove 62d of the third base member 22 are mutually facing. The fourth base member 31 and the fifth base member 32 are placed so that the opposite side of the groove 63a of the fourth base member 31 and the side of the groove 64a of the fifth base member 32 are mutually facing. The fourth base member 31 is placed so as to be sandwiched between the second base members 21, and the fifth base member 32 is placed so as to be sandwiched between the third base members 22. By placing the second base member 21, the third base member 22, the fourth base member 31 and the fifth base member 32 as described above, the grooves 62d and 63a are lined up and communicated with each other, and the grooves 62d and the 64a are also lined up and communicated with each other.

Subsequently, molten glass is applied at upper end of the communicating grooves 62d and 64a (see FIG. 10). When the molten glass is solidified, as shown in FIG. 3A, by the virtue of the solidified glass GL at the upper end of the communicating grooves 62d the second base member 21 and the third base member 22 are conjugated with each other, and as shown in FIG. 3B, by the virtue of the solidified glass GL at the upper end of the communicating grooves 64a, the fourth base member 31 and the fifth base member 32 are conjugated with each other. The glass GL having been solidified on the upper end of the mutually communicating grooves 62d and 64a conjugates the second base member 21 with the fourth base member 31, and conjugates the third base member 22 with the fifth base member 52. Specifically, the second base member 21, the third base member 22, the fourth base member 31, and the fifth base member 32 are conjugated to be unified.

As shown in FIG. 3A, when the second base member 21 and the third base member 22 are conjugated with each other, the magnetic portion 21b of the second base member 21 is conjugated with the magnetic portion 22b of the third base member 22. Also, as shown in FIG. 3B, when the fourth base member 31 and the fifth base member 32 are conjugated with each other, the magnetic portion 31a of the fourth base member 31 is conjugated with the fifth base member 22.

Furthermore, as described above, the magnetic part 21b is embedded in the non-magnetic portion 21b (see FIG. 6), and the magnetic part 22b is embedded in the non-magnetic portion 22a (see FIG. 7). Consequently, when the second base member 21, the third base member 22, the fourth base member 31, and the fifth base member 32 are unified, the magnetic portion 21b and the magnetic portion 22b are magnetically insulated with the magnetic portion 31b and the fifth base member 32.

Next, as shown in FIG. 11A, the first base member 11 and the non-magnetic member 50 having the magnetic film 12 are conjugated by the glass GL. At this time, the non-magnetic member 50 and the magnetic film 12 are conjugated with the first base member 11 so as to be projecting from an upper end of the first base member 11.

Next, a unified block 65 (see FIG, 11B) having the second base member 21, the third base member 22, the fourth base member 31, and the fifth base member 32 unified with each other are combined with the non-magnetic member 50 with which the first base member 11 is conjugated. Furthermore, at an upper end of the mutually communicating grooves 61a and 63a (see FIG. 10), the molten glass is applied. When the molten glass is solidified, as shown in FIG. 1C, by the virtue of the solidified glass GL on the upper end of the grooves 61a and 63a, the unified block 65 is conjugated with the non-magnetic member 50. Specifically, the first base member 11, the second base member 21, the fourth base member 31, and the fifth base member 32 are conjugated to be unified, completing this conjugation stage.

When the first base member 11 is conjugated with the non-magnetic member 50 having the magnetic film 12, as shown in FIG. 3A, the magnetic layer 11b and the magnetic film 12 of the first base member 11 are conjugated. Then, as shown in FIG. 6C, the magnetic layer 11b and the magnetic film 12 are magnetically insulated with the unified block 65 by means of the non-magnetic member 50. Specifically, as shown in FIG. 3A, the magnetic layer 11b and the magnetic film 12 are magnetically insulated with the magnetic portion 21b and the magnetic portion 22b, and as shown in FIG. 3B, they are also magnetically insulated with the magnetic portion 31b and the fifth base member 32.

(Stage for Forming Surface Magnetic Film)

At an upper end of the unified block of the first base member 11, the second base member 21, and the third base member 22, the surface magnetic film 13 (see FIG. 3A) and the surface magnetic film 23 (see FIG. 3A) are formed.

Prior to the formation of the surface magnetic film 13 and the surface magnetic film 23, as shown in FIG. 12, the DC-erasing gap 10G is formed on an upper end of the first base member 11, and an upper end of the second base member 21 and the third base member 22, the servo writing gap 20G is formed between the magnetic portion 21a and the magnetic portion 22b.

These DC-erasing gap 10G and the servo writing gap 20G are patterned by a photolithographic method utilizing a single mask to be formed simultaneously.

The stage for simultaneously forming these DC-erasing gap 10G and the servo writing gap 20G will be described in more detail. First, the non-magnetic material such as silica film (hereinafter referred to as SiO₂ film) is formed so as to cover upper ends of the first base member 11, the second base member 21, and the third base member 22. A photo resist (optically sensitive resin) is applied in a thin film state onto the SiO₂ film. Thereafter, a single mask having plane shapes of the DC-erasing gap 10G and the servo writing gap 20G having been formed in a layout as shown in FIG. 12, and a light source such as a mercury lamp are used to expose the photo resist in a thin film form. By exposing the photo resist as described above, the DC-erasing gap 10G and the servo writing gap 20G are patterned on the photo resist. Thereafter, unnecessary photo resist are developed by a developer and then removed. A part of the SiO₂ film where no photo resist is adhered is removed by HF (hydrofluoric acid) or such to form the DC-erasing gap 10G and he servo writing gap 20G.

Subsequently, onto upper ends of the first base member 11, the second base member 21, and the third base member 22, the surface magnetic film 13 and the surface magnetic film 23 are formed so as to be filled with the circumferences of the formed DC-erasing gap 10G and the formed servo writing gap 20G. At this time, as shown in FIG. 1, the surface magnetic film 23 and the AC-erasing head 30 are formed so as to be mutually separated with each other, whereby the core 20A (see FIG. 3A) of the servo writing head 20 and the core 30A (see FIG. 3B) of the AC-erasing head 30 are magnetically insulated in a mutual manner. The formation of the surface magnetic film 13 and the surface magnetic film 23 maybe performed by a sputtering method utilizing the soft magnetic material as a target or such.

The upper ends of the DC-erasing gap 10G, the servo writing gap 20G, the AC-erasing head 30, the magnetic film 12, the non-magnetic member 50, the surface magnetic film 13 and the surface magnetic film 23 are polished. Subsequently, as shown in FIG. 13, a protective film Pr made of DLC (diamond-like carbon) or such is formed on these upper ends. Then, As shown in FIG. 1, the coil 10c is wound around the coil groove 11a, whereby the stage for producing the composite magnetic head H1 according to this embodiment is completed.

In the process for producing the composite magnetic head as described above, since the DC-erasing gap 10G and the servo writing gap 20G (see FIG. 12) are patterned by utilizing a single mask, the mutual positional relation between the DC-erasing gap 10G and the servo writing gap 20G is aligned in a high precision. Consequently, according to the process for producing the composite magnetic head as described above, the composite magnetic head H1 (see FIG. 1) in which the DC-erasing head 10 (see FIG. 1) can DC-erase the magnetization M of the servo band SB in a highly selective manner, and in which the servo writing head 20 (see FIG. 1) can write the servo signal on the servo band SB where the magnetization M thereof has been DC-erased by the DC-erasing head 10 in a highly selective manner, can be produced. Also, according to the process for producing the composite magnetic head as described above, the composite magnetic head (see FIG. 1) can be produced in which even if the magnetization (not shown) of the data band DB (see FIG. 4) is DC-erased by the DC-erasing head 10, the AC-erasing head 30 (see FIG. 1) can AC-erase the magnetization of the data band DB in a highly precision manner.

While the preferred embodiment of the present invention has been exemplified, the present invention is not restricted thereto.

For example, whereas the composite magnetic head H1 in which a base portion of the servo band SB is magnetized in the normal direction, and a portion of the servo signal SS is magnetized in the reverse direction in the foregoing embodiments, the present invention is not restricted. Specifically, the composite magnetic head of the present invention may magnetize the base portion of the servo band in the reverse direction and magnetize the portion of the servo signal in the normal direction.

In the forgoing embodiments, the composite magnetic head H1 which writes a servo pattern SP composed of one burst Ba and one burst Bb, the present is not restricted thereto. For example, it may also possible that intervals of the pulse supplied to the coil 21c of the servo writing head 20 is changed so that the composite magnetic head according to the present invention may write a servo pattern SP composed of a plurality of the burst Ba and/or a plurality of the burst Bb.

Also, whereas the process for producing the composite magnetic head comprising the formation of the DC-erasing gap 10G and the servo writing gap 20F, followed by forming the surface magnetic film 13 and the surface magnetic film 23 has been described in the foregoing embodiment, the present invention is not restricted thereto. Specifically, the composite magnetic head may be produced by forming the surface magnetic film 13 and the surface magnetic film 23 followed by patterning the plane shapes of the DC-erasing gap 10G and the servo writing gap 30G by means of the single mask, removing the patterned portions of the surface magnetic film 13 and the surface magnetic film 23, and then filling the non-magnetic material with the removed, patterned portion to thereby form the DC-erasing gap 10G and the servo writing gap 20G, respectively.

What is claimed is:

1. A composite magnetic head comprising:
   a DC-erasing head, which is slidably contact with a driving magnetic tape, and which DC-erases a servo band of said magnetic tape in such a manner that the direction of the magnetization of said servo band the servo band is directed towards one direction of the lengthwise direction of said magnetic tape;
   a servo writing head, which is slidably contact with said magnetic tape, and which writes a servo signal thereon so that the direction of the magnetization of the servo band is directed toward the reverse direction to the direction directed by the DC erasing head; and
   an AC-erasing head, which is contact with said magnetic tape, and which AC-erases the magnetization of the data band of said magnetic tape;
   said servo writing head and said AC-erasing head being provided at downstream of the driving magnetic tape relative to the DC-erasing head, and
   said DC-erasing head, said servo writing head and said AC-erasing head being unified with each other.

2. The composite magnetic head according to claim 1, wherein said DC-erasing gap of the DC-erasing head and the servo writing gap of the servo writing head are formed by simultaneous patterning by a photolithographic method utilizing a single mask.

3. The composite magnetic head according to claim 2, wherein said DC-erasing head, said servo writing head, and said AC-erasing head are conjugated via a non-magnetic member.

4. The composite magnetic head according to claim 2, wherein the core making up the DC-erasing head, the core making up the servo writing head, and/or the core making up the AC-erasing head are made of a soft magnetic material.

5. The composite magnetic head according to claim 4, wherein said soft magnetic comprises an Ni—Fe alloy, sendust, alperm, or an amorphous alloy.

6. The composite magnetic head according to claim 2, wherein said servo writing gap comprises a two non-parallel non-linear pattern.

7. The composite magnetic head according to claim 2, wherein said C-erasing gap of the AC-erasing head comprises a liner pattern connecting one end of the AC-erasing head in the width direction to the other end thereof.

8. The composite magnetic head according to claim 1, wherein said DC-erasing head, said servo writing head, and said AC-erasing head are conjugated via a non-magnetic member.

9. The composite magnetic head according to claim 8, wherein said non-magnetic member comprises aluminum titanium carbide, a non-magnetic ferrite, calcium titanate, or silica.

10. The composite magnetic head according to claim 8, wherein said non-magnetic member comprises aluminum titanium carbide, a non-magnetic ferrite, calcium titanate, or silica.

11. The composite magnetic head according to claim 1, wherein the core making up the DC-erasing head, the core making up the servo writing head, and/or the core making up the AC-erasing head are made of a soft magnetic material.

12. The composite magnetic head according to claim 11, wherein said soft magnetic comprises an Ni—Fe alloy, sendust, alperm, or an amorphous alloy.

13. The composite magnetic head according to claim 1, wherein said servo writing gap comprises a two non-parallel non-linear pattern.

14. The composite magnetic head according to claim 1, wherein said AC-erasing gap of the AC-erasing head comprises a liner pattern connecting one end of the AC-erasing head in the width direction to the other end thereof.

15. A process for producing a composite magnetic head, the process comprising:
   forming a core making-up a DC-erasing head;
   forming a core making up a servo writing head;
   forming a core making up an AC-erasing head, and forming thereon an AC-head gap, which AC-erases the magnetization of a magnetic tape;
   unifying the core of the DC-erasing head, the core of the servo writing head, and the core of the AC-erasing head with each other;
   forming a DC-erasing gap, which DC-erases magnetization of a magnetic tape, on the core of the DC-erasing head; and
   forming a servo writing gap, which writes a servo signal on a magnetic tape, on the core of the servo writing head;
   said DC-erasing gap and said servo writing gap being formed by a simultaneous patterning according to a photolithographic method utilizing a single mask.

16. A tape drive comprising:
   a composite magnetic head comprising:
   a DC-erasing head, which is slidably contact with a driving magnetic tape, and which DC-erases a servo band of said magnetic tape in such a manner that the direction of the magnetization of said servo band the servo band is directed towards one direction of the lengthwise direction of said magnetic tape;
   a servo writing head, which is slidably contact with said magnetic tape, and which writes a servo signal thereon so that the direction of the magnetization of the servo band is directed toward the reverse direction to the direction directed by the DC erasing head; and
   an AC-erasing head, which is contact with said magnetic tape, and which AC-erases the magnetization of the data band of said magnetic tape;

said servo writing head and said AC-erasing head being provided at downstream of the driving magnetic tape relative to the DC-erasing head, and said DC-erasing head, said servo writing head and said AC-erasing head being unified with each other,; and a tape driving system.

17. The tape drive according to claim 16, wherein said DC-erasing gap of the DC-erasing head and the servo writing gap of the servo writing head are formed by simultaneous patterning by a photolithographic method utilizing a single mask.

18. The tape drive according to claim 16, wherein said servo writing head, and said AC-erasing head are conjugated via a non-magnetic member.

19. The tape drive according to claim 16, wherein said DC-erasing head, said servo writing head, and said AC-erasing head are conjugated via a non-magnetic member.

20. The tape drive according to claim 16, wherein said servo writing gap comprises a two non-parallel non-linear pattern.

* * * * *